United States Patent [19]

Zander et al.

[11] Patent Number: 5,517,265
[45] Date of Patent: May 14, 1996

[54] METHOD AND APPARATUS FOR PREVENTING UNAUTHORIZED RECYCLING OF SINGLE-USE CAMERA AND PERMITTING AUTHORIZED REUSE OF THE CAMERA

[75] Inventors: Dennis R. Zander, Penfield; Clay A. Dunsmore, Fairport, both of N.Y.

[73] Assignee: Eastman Kodak Company, Rochester, N.Y.

[21] Appl. No.: 370,084

[22] Filed: Jan. 9, 1995

[51] Int. Cl.$^6$ .......................... G03B 17/36; G03B 29/00
[52] U.S. Cl. .......................... 354/76; 354/217
[58] Field of Search .................. 354/75, 76, 212, 354/217

[56] References Cited

U.S. PATENT DOCUMENTS

| | | | |
|---|---|---|---|
| 3,320,490 | 5/1967 | Beck et al. | 317/134 |
| 3,953,769 | 4/1976 | Sopko | 317/134 |
| 4,455,074 | 6/1984 | Wong et al. | 354/173.1 |
| 4,494,114 | 1/1985 | Kaish | 340/825.3 |
| 5,021,811 | 6/1991 | Maurinus et al. | 354/76 |
| 5,049,911 | 9/1991 | Shimizu | 354/217 |
| 5,235,366 | 8/1993 | Kucmerowski | 354/212 |
| 5,418,585 | 5/1995 | Petruchik et al. | 354/76 |

FOREIGN PATENT DOCUMENTS

4-177230A  6/1992  Japan.

*Primary Examiner*—Michael L. Gellner
*Assistant Examiner*—Eddie C. Lee
*Attorney, Agent, or Firm*—Roger A. Fields

[57] ABSTRACT

When an exposure counter in a single-use camera indicates that the maximum number of exposures on a roll of film in the camera have been exposed, a function of the camera such as an electronic flash capability is disabled to prevent unauthorized recycling of the camera. A reset code must be inputted to the camera to initialize the exposure counter and to enable the electronic flash capability, to permit authorized reuse of the camera with another roll of film. If an invalid code is inputted to the camera, the electronic flash capability is permanently disabled or cannot be re-enabled for a period of time.

9 Claims, 6 Drawing Sheets

METHOD AND APPARATUS FOR PREVENTING UNAUTHORIZED RECYCLING OF SINGLE-USE CAMERA AND PERMITTING AUTHORIZED REUSE OF THE CAMERA

CROSS-REFERENCED TO RELATED APPLICATIONS

Reference is made to commonly assigned application Ser. No. 08/210,983, U.S. Pat. No. 5,418,585, entitled METHOD AND APPARATUS FOR PREVENTING UNAUTHORIZED RECYCLING OF SINGLE-USE CAMERA AND PERMITTING AUTHORIZED REUSE OF THE CAMERA, and filed Mar. 21, 1994 in the name Dwight J. Petruchick and Clay A. Dunsmore.

FIELD OF THE INVENTION

The invention relates generally to the field of photography, and in particular to single-use cameras. More specifically, the invention relates to a method and apparatus for preventing unauthorized recycling of a single-use camera after a roll of film in the camera is completely exposed and for permitting authorized reuse of the camera when the roll of film is replaced with another one.

BACKGROUND OF THE INVENTION

Film and cameras that are all in one, commonly referred to as single-use cameras, have recently become well known. Typically, the single-use camera is a simple point-and-shoot type comprising a plastic main body portion which supports a fixed-focus taking lens, a film metering mechanism, a manual film advance thumbwheel, a single-blade shutter, a manual shutter release button, a frame counter for indicating the number of exposures remaining for picture-taking, a direct see-through viewfinder tunnel, and possibly an electronic flash unit. Front and rear plastic casing or cover portions house the main body portion between them to form a light-tight camera unit. A decorative cardboard outer box contains the camera unit and has respective openings for the taking lens, the shutter release button, the film advance thumbwheel, the viewfinder tunnel, the frame counter, and a flash emission window.

At the manufacturer, the main body portion is loaded with a conventional 12, 24, or 36 exposure 35 mm film cartridge and the front and rear casing portions are connected to each other and/or to the main body portion to assemble the light-tight camera unit. Then, an exposed end of a supply spool in the main body portion is rotated to factory prewind substantially the entire length of the unexposed filmstrip from the cartridge onto the supply spool. Lastly, the outer box is placed on the camera unit.

After the photographer takes a picture using the single-use camera, he or she manually rotates the thumbwheel in engagement with a take-up spool inside the cartridge to rewind the exposed frame into the cartridge. The rewinding movement of the filmstrip the equivalent of slightly more than one frame width rotates a metering sprocket in engagement with the filmstrip to decrement the frame counter to its next lower-numbered setting. When the maximum number of exposures available on the filmstrip are exposed and the filmstrip is completely rewound into the cartridge, the single-use camera is given to a photofinisher who tears the outer box off the camera unit, separates the rear cover portion from the main body portion, and removes the cartridge with the filmstrip from the main body portion. Then, he removes the filmstrip from the cartridge to develop the negatives and make prints for the customer, and he forwards the used camera parts to the manufacturer for recycling, i.e. remanufacture.

During recycling, the main body portion is re-loaded with a film cassette containing fresh film, and the front and rear casing portions are re-connected to each other and/or to the main body portion. Then, the exposed end of the supply spool in the main body portion is again rotated to factory prewind substantially the entire length of the unexposed filmstrip from the cartridge onto the supply spool. Lastly, a new outer box is placed on the camera unit.

There is a need recognized in the industry to prevent unauthorized recycling of single-use cameras in order to maintain camera quality. Unauthorized recycled cameras may be of lesser quality than authorized recycled cameras.

THE CROSS-REFERENCED APPLICATION

The cross-referenced application discloses a method of preventing unauthorized recycling of a single-use camera but permitting authorized reuse of the camera. According to the method, it is first determined that the maximum number of exposures on a roll of film in the camera is exposed. Then, a function of the camera such as electronic flash capability is disabled to prevent unauthorized reuse of the camera with a roll of fresh film. To permit authorized reuse of the camera with the roll of fresh film, a predetermined unique reset code must be inputted to the camera. The reset code re-enables the function that has been disabled.

SUMMARY OF THE INVENTION

According to one aspect of the invention, a method of preventing unauthorized recycling of a single-use camera but permitting authorized reuse of the camera, comprising first determining that a particular event in the camera has occurred, then disabling a function of the camera to prevent unauthorized reuse of the camera, and then inputting a reset code to the camera to re-enable the function that has been disabled to permit authorized reuse of the camera, is characterized further by:

determining whether a reset code that is inputted to the camera is valid or invalid; and preventing the function that has been disabled from being re-enabled permanently or for a period of time when the reset code is determined to be invalid.

According to another aspect of the invention, a single-use camera comprising means for determining that completed use of the camera has occurred, means for disabling a function of the camera to prevent unauthorized reuse of the camera when completed use of the camera has occurred, and means for receiving a reset code from a separate code inputting device to re-enable the function that has been disabled to permit authorized reuse of the camera, is characterized further by:

means for determining whether a reset code that is inputted to the camera is valid or invalid; and means for preventing the function that has been disabled from being re-enabled at least for a period of time when the reset code is determined to be invalid.

DETAILED DESCRIPTION OF THE INVENTION

The invention is disclosed as being embodied preferably in a single-use 35 mm camera having a built-in electronic flash unit. Because the features of such a camera are generally known, the description which follows is directed in particular only to those elements forming part of or cooperating directly with the disclosed embodiment. It is to be understood, however, that other elements may take various forms known to a person of ordinary skill in the art.

Figure 1:
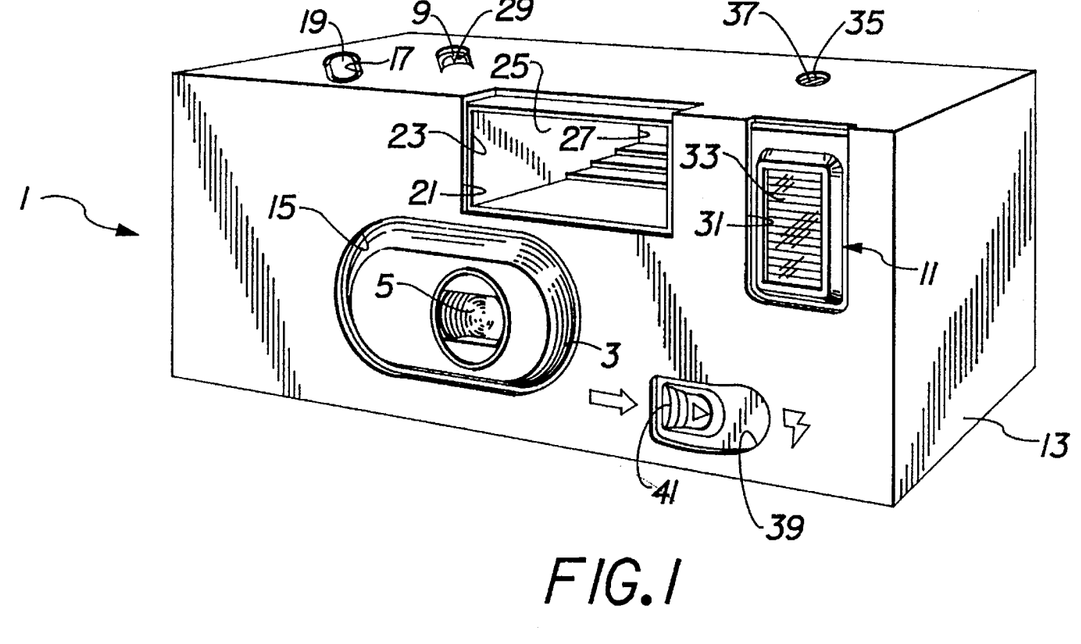
FIG. 1 is a front perspective view of a single-use camera with a built-in electronic flash unit.
Figure 2:
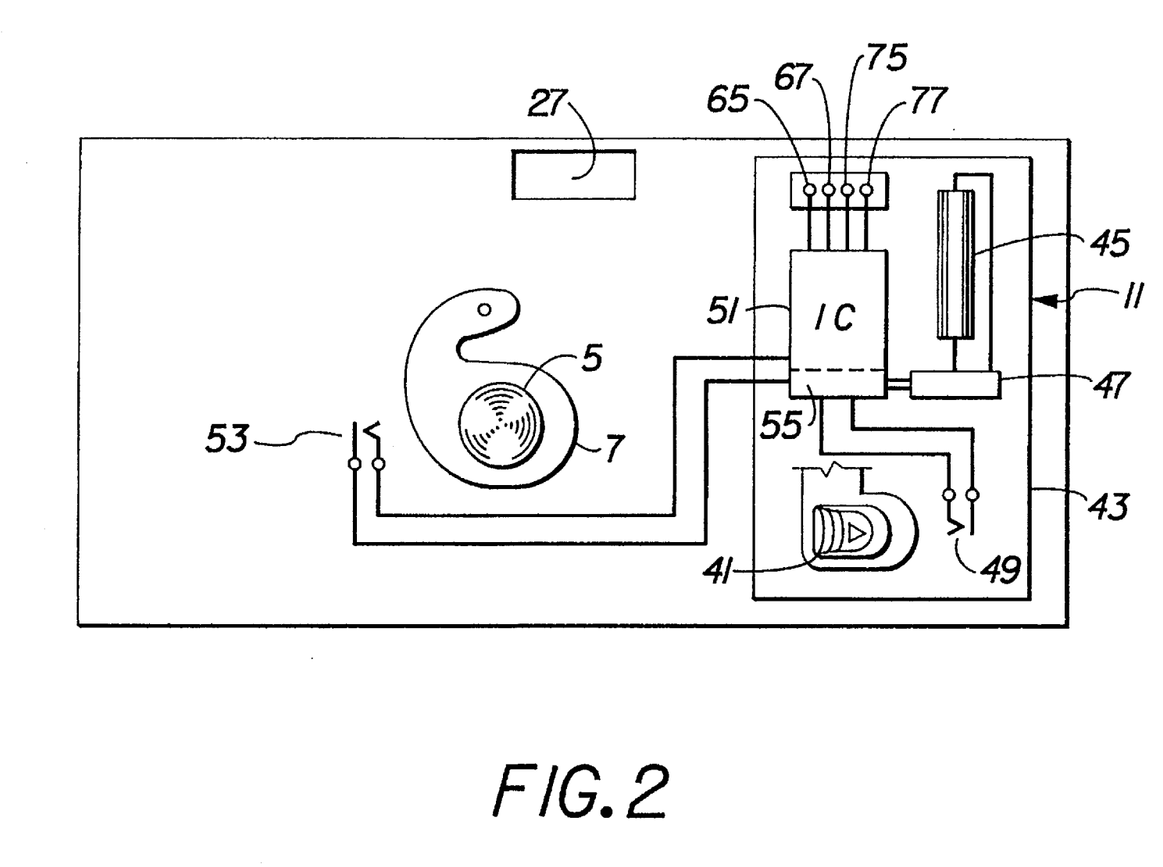
FIG. 2 is a front elevation view of the camera as seen from the inside to show various components that comprise a preferred embodiment of the invention.

Referring now to the drawings, FIGS. 1 and 2 show a single-use camera 1 which comprises a plastic light-tight camera unit 3 housing a known fixed-focus taking lens 5, a known film metering mechanism, not show, a known single-blade shutter 7, a known frame counter 9 for visibly indicating the number of exposures remaining for picture-taking, and an electronic flash unit 11. A cardboard outer cover or casing 13 contains the camera unit 3 and has a front opening 15 for the taking lens 5, a top opening 17 for a manual shutter release button 19, a rear opening for a manual film advance thumbwheel, not shown, a front opening 21 for a front viewfinder window 23 of a direct see-through viewfinder 25, a rear opening, not shown, for a rear viewfinder window 27, a top opening 29 for the frame counter 9, a front opening 31 for a flash emission window 33, a top opening 35 for a flash-ready light emitting diode (LED) 37, and a front opening 39 for a manual push element 41 which is pushed to the right in FIGS. 1 and 2 to ready the flash unit 11.

The flash unit 11 as shown in FIG. 2 includes a flash circuit board 43 on which is mounted a known flash tube 45 located behind the flash emission window 33, a known flash charger circuit 47 for storing a suitable voltage to ignite the flash tube to provide flash illumination, a normally open flash charger circuit switch 49 that is closed by sliding the push element 41 to the right in FIGS. 1 and 2 to activate or energize the flash charger circuit, and an integrated control circuit (IC) 51. The IC 51 is connected to a separate normally open shutter-flash synch switch 53 which is closed every time the shutter blade 7 is pivoted clockwise in FIG. 2 to momentarily uncover the taking lens 5 to take a picture.

At the manufacturer, the camera unit 3 is loaded with a conventional 12, 24, or 36 exposure 35 mm film cartridge and substantially the entire length of the unexposed filmstrip is factory prewound from the cartridge onto a spool, not shown, in the camera unit. Also, the frame counter 9 is set to the maximum number of exposures available on the unexposed filmstrip. After the photographer takes a picture, he or she manually rotates the thumbwheel to rewind the exposed frame into the cartridge. The rewinding movement of the filmstrip the equivalent of slightly more than one frame width rotates a metering sprocket, not shown, to decrement the frame counter 9 to its next lower numbered setting, e.g. from "36" to "35". Further details of this operation are disclosed in commonly assigned U.S. Pat. No. 5,235,366, issued Aug. 10, 1993. When the maximum number of exposures available on the filmstrip are exposed and the filmstrip is completely rewound into the cartridge, the single-use camera 1 is given to a photofinisher who first removes the filmstrip from the camera unit 3 to develop the negatives and then forwards the camera unit to the manufacturer for recycling. The manufacturer, in turn, recycles the camera unit 3 by loading it with another roll of film and repeating the foregoing prewinding process.

Figure 3:
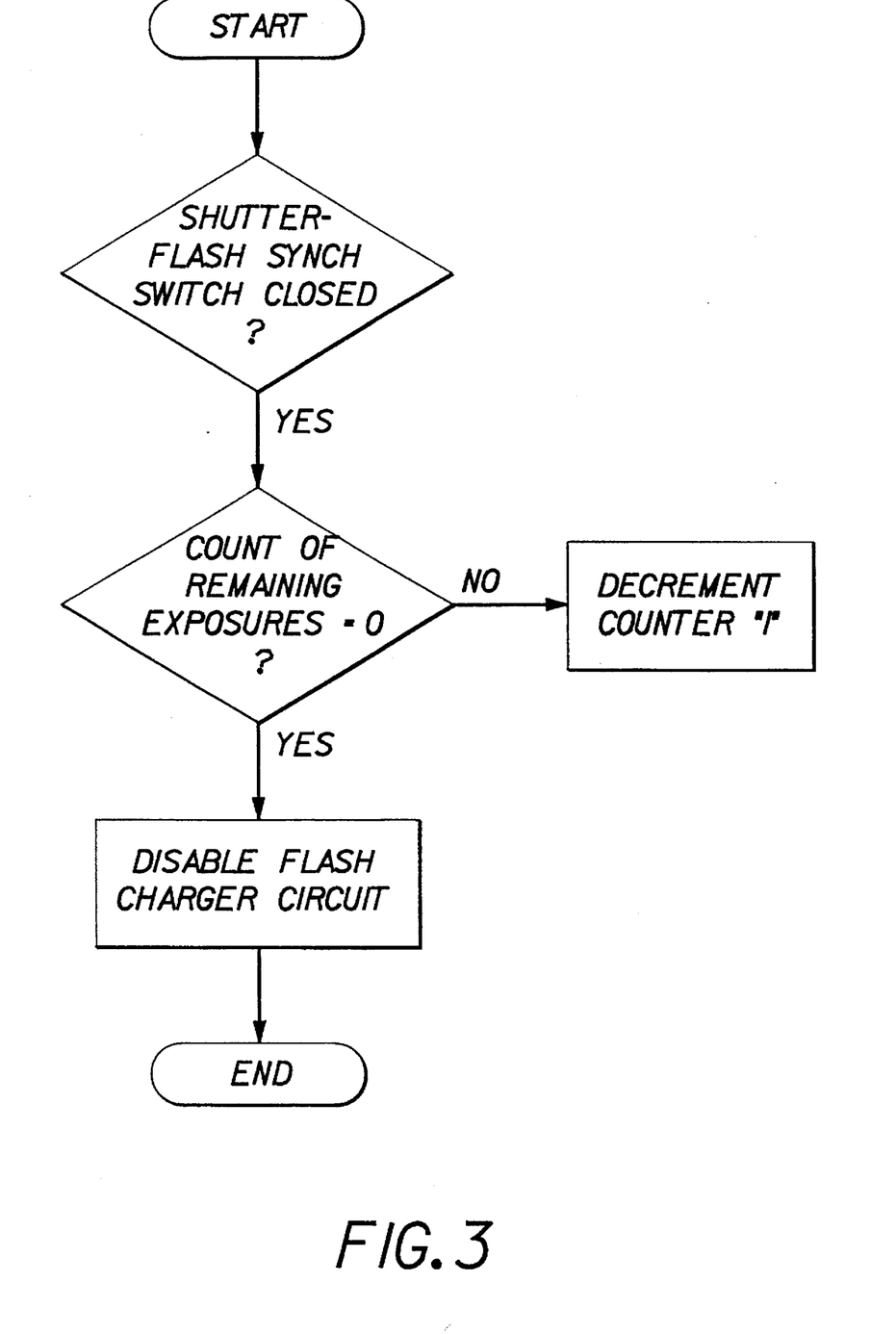
FIG. 3 is a a flow chart.

The IC 51 includes a known count-down counter 55 which when initialized is set to the maximum number of exposures available on a roll of film in the camera unit 3 (similar to the frame counter 9). The counter 55 is adapted to be decremented by "1" when the shutter-flash synch switch 53 is closed by the shutter blade 7 to take a picture, to provide a count of the number of exposures remaining to be made on the roll of film. As shown in FIG. 3, each time the shutter-flash synch switch 53 is closed, the IC 51 interrogates the counter 55 to determine whether its count is at least "1". If the count is at least "1" the counter 55 is decremented by "1". Conversely, if the counter is "0" the flash charger circuit 47 is disabled.

Figure 4:
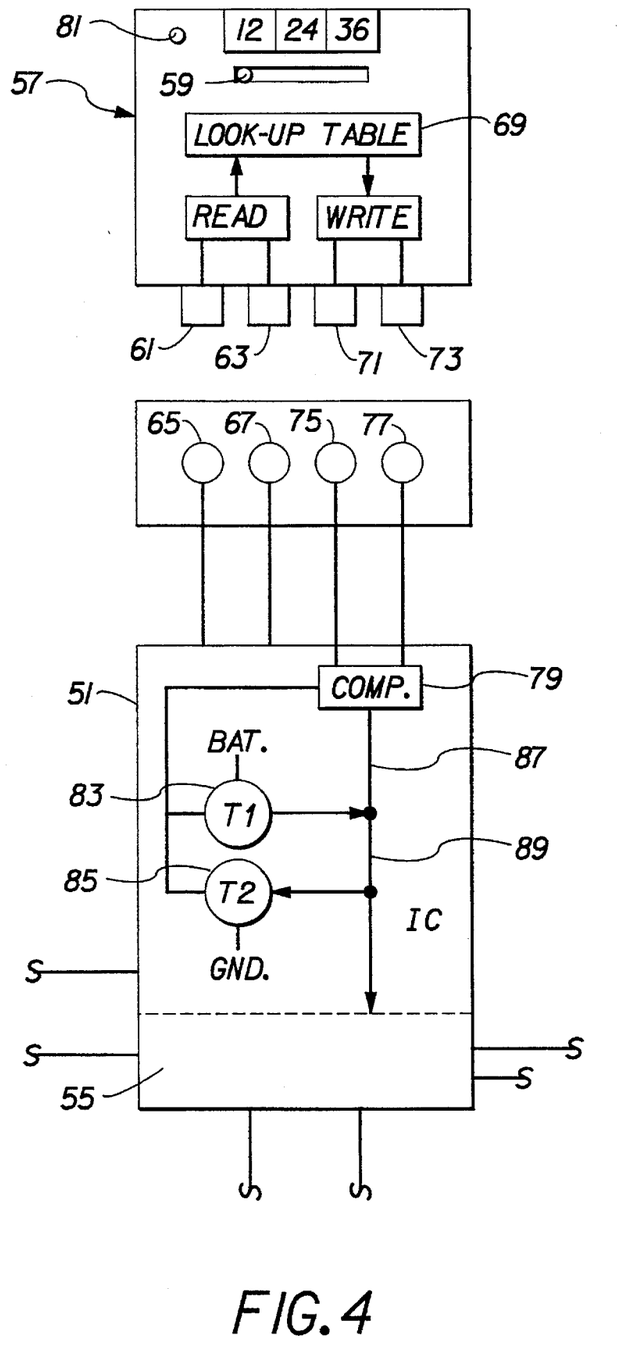
FIG. 4 is a schematic view of other components of the preferred embodiment.
Figure 5:
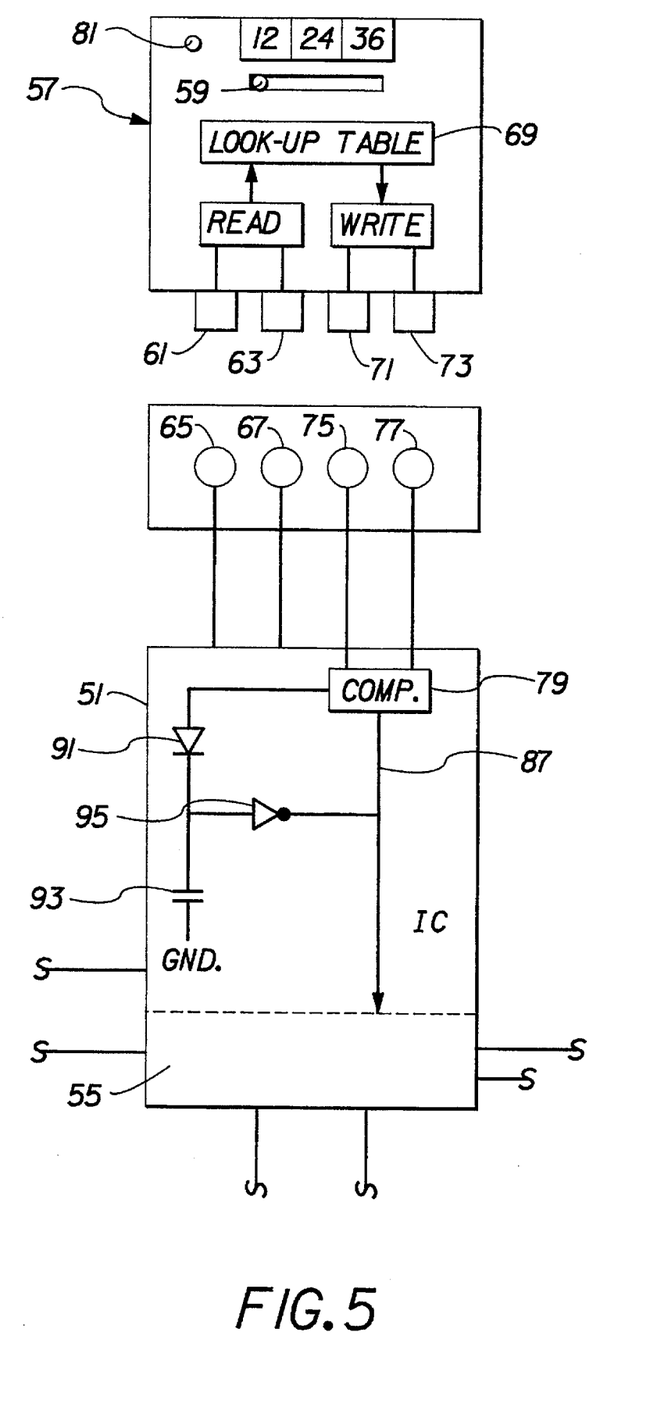
FIG. 5 is a schematic view of other components of an alternate embodiment.
Figure 6:
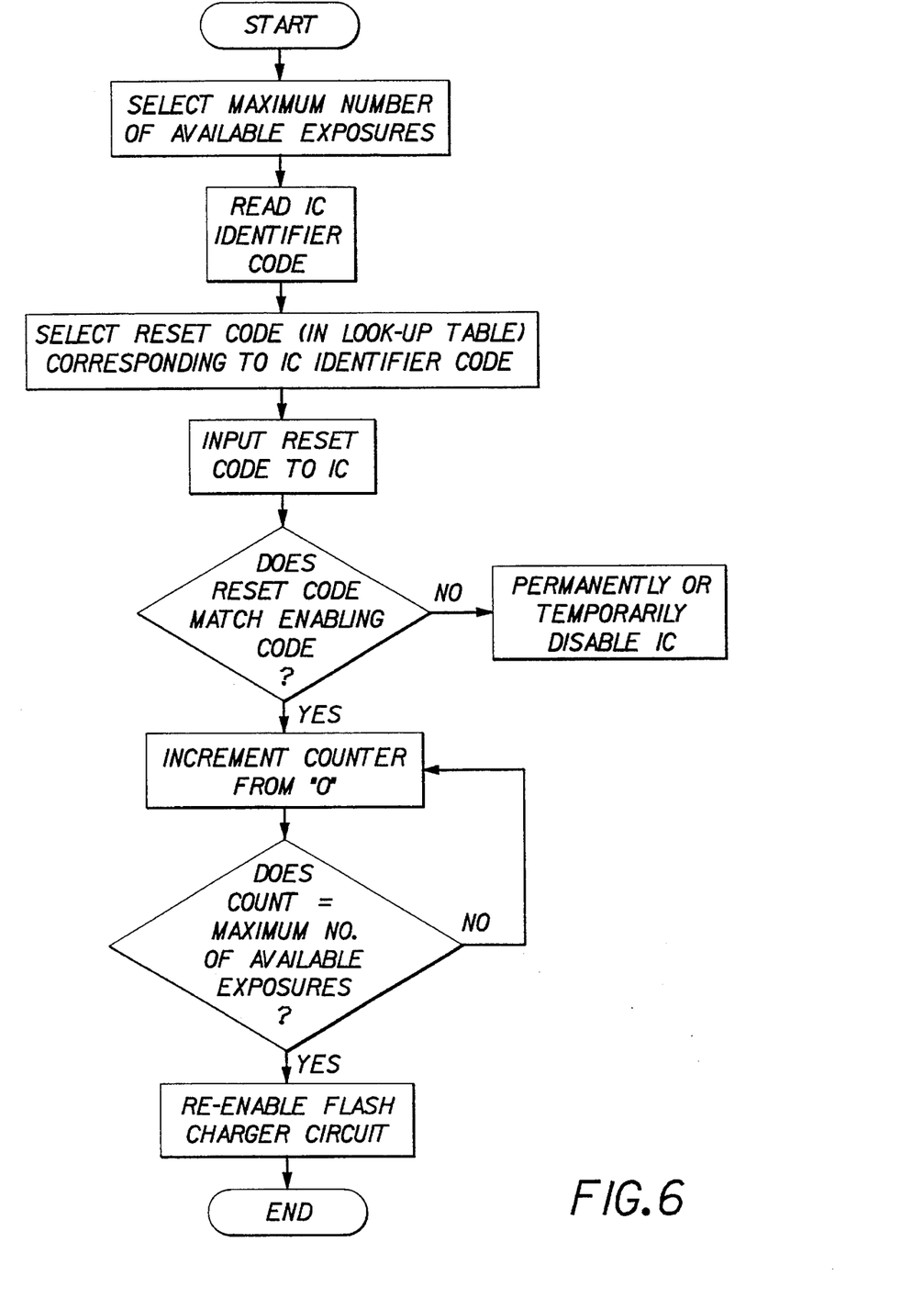
FIG. 6 is a flow chart.

When the flash charger circuit 47 is disabled, the camera unit 3 cannot be effectively recycled unless authorized. According to the invention, there is provided a method of permitting only authorized recycling of the camera unit 3. This method is depicted in FIG. 6 and comprises the following steps:

(1) The maximum number of exposures available on a fresh roll of film loaded or to be loaded in the camera unit 3 is selected on a code inputting device 57 by manually sliding a pointer 59 to the selected number "12" "24" or "36". The code inputting device 57 is shown in FIGS. 4 and 5.

(2) A pair of read pins 61 and 63 of the code inputting device 57 are manually connected to respective mating contacts 65 and 67 of the IC 51 to permit the code inputting device to read an identifier code provided by the IC. Preferably, the identifier code is unique to the IC 51 to make it more difficult to decipher that code and is in electrical digital format, e.g. a binary number. Alternatively, the identifier code can be in electrical analog format instead of electrical digital format, e.g. a predetermined voltage, current, resistance or other value. Also, the indentifier code can be optical in nature, such as a bar code, or it can be magnetic in nature.

(3) The code inputting 57 includes a look-up table 69 having a plurality of identifier codes (for various IC's), one of which is the identifier code that has been read in step 2, and a plurality of reset codes that correspond 1:1 to the identifier codes, and is adapted via a central processing unit (CPU), not shown, to select the reset code that corresponds to the identifier code that has been read in step 2. Also, the plurality of reset codes correspond 1:1 to various enablement codes (provided in respective IC's), one of which is provided in the IC 51 for instructing that IC to trigger incrementing the counter 55 from "0" to the number of exposures selected in step 1 and to trigger re-enabling the flash charger circuit 47. The reset codes and the enablement codes, like the identifier code, can be a number of different types, e.g. electrical, optical, or magnetic, digital or analog.

(4) A pair of write pins 71 and 73 of the code inputting device 57 are manually connected to respective mating contacts 75 and 77 of the IC 51 to input the reset code that has been selected in step 3 to a comparator 79 in the IC. The comparator 79 determines whether the reset code that is inputted to the IC 51 matches the enablement code in the IC, i.e. it determines whether the reset code is valid. Presumably, the reset code that is inputted to the IC 51 will match the enablement code in the IC. As a result, the counter 55 will be incremented from "0" to the number of exposures selected in step 1 and the flash charger circuit 49 will be re-enabled.

(5) If the reset code that is inputted to the IC 51 does not match the enablement code in the IC, a visible warning indicator 81 on the code inputting device 57 is activated. Also, as indicated in FIG. 6, the IC 51 is permanently or temporarily disabled to prevent the counter 55 from being incremented from "0" to the number of exposures selected in step 1 and to prevent the flash charger circuit 47 from being re-enabled.

(5.1) FIG. 4 depicts a means within the IC 51 for permanently disabling the IC when the reset code that is inputted to the IC does not match the enablement code in the IC. Specifically, in the IC 51 a pair of transistors 83 and 85 are connected to the comparator 79 and to a lead-line 87 from the comparator to the counter 55. The respective transistors 83 and 85 are connected to the lead-line 87 at opposite ends of an intermediate fuse-link portion 89 of the lead-line. The fuse-link portion 89 is constructed to burn or melt when subjected to a relatively high current. When the comparator 79 determines there is no match between the reset code that is inputted to the IC 51 and the enablement code in the IC, current from a battery to a ground is conducted via the two transistors 83 and 85 along the fuse-link portion 89 of the lead-line 87. The two transistors 83 and 85 cause the current in the fuse-link portion 89 to become sufficiently high to melt the fuse-link portion in order to permanently disable the IC 51. Thus, the counter 55 is permanently prevented from being incremented from "0" to the number of exposures selected in step 1 and the flash charger circuit 47 is permanently prevented from being re-enabled. Conversely, when the comparator 79 determines there is a match between the reset code that is inputted to the IC 51 and the enablement code in the IC, current is conducted along the lead-line 87 (including the fuse-link portion 89) from the comparator 79 to the counter 55. Since there is no opportunity for the current in the fuse-link portion 89 to build up sufficiently to melt the fuse-link portion, the IC 55 is not disabled. Thus, the counter 55 is incremented from "0" to the number of exposures selected in step 1 and the flash charger circuit 47 is re-enabled.

(5.2) Alternatively, FIG. 5 depicts a means within the IC 51 for temporarily disabling the IC, i.e. disabling the IC for a period of time rather than permanently, when the reset code that is inputted to the IC does not match the enablement code in the IC. Specifically, when the reset code that is inputted to the IC 51 does not match the enablement code in the IC, the comparator 79 provides a high signal to a common diode 91. A power capacitor 93 encapsulated with the IC 51 is charged through the diode 91 in response to the high signal at the diode. As is known, the capacitor normally stores electrical energy for a period of time. The capacitor 93, for as long as it is charged, e.g. at least one hour, continuously causes a high-impedance inverter 95 to provide a low signal via the lead-line 87 to the counter 55. The low signal at the counter 55, as long as it remains, prevents the counter from being incremented from "0" to the number of exposures selected in step 1 and prevents the flash charger circuit 47 from being re-enabled. Conversely, when the reset code inputted to the IC 51 does match the enablement code in the IC, the comparator 79 provides a high signal via the lead-line 87 to the counter 55. The high signal at the counter 55 causes the counter to be incremented from "0" to the number of exposures selected in step 1 and causes the flash charger circuit 47 to be re-enabled.

The term "code" or "codes" as used in regard to the start code, the identifier code, the reset code, and the enablement code is intended to be given the common ordinary meaning, i.e. a system of signals or symbols for communication used to represent assigned and often secret meanings, such as in the case of the Morse code and the binary and other machine languages used in digital computers.

The invention has been described with reference to a preferred embodiment. However, it will be appreciated that variations and modifications can be effected by a person of ordinary skill in the art without departing from the scope of the invention. For example, instead of disabling the flash charger circuit 49 to prevent the flash function of the camera unit 3, anyone of several other known functions or operations of the camera unit such as shutter operation or film advance operation can be disabled. In this sense, the terms "functions" and "operations" are intended to be equivalents. Also, instead of counting the number of closures of the shutter-flash synch switch 53 for the purpose of disabling a function of the camera unit 3, various other events may be used to determine when to disable a function of the camera unit. For instance, a function of the camera unit 3 can be disabled in response to removing an exposed roll of film from the camera unit, in response to removing a battery from the camera unit, or in response to opening the camera unit to remove the exposed roll of film.

As suggested in commonly assigned U.S. Pat. No. 5,021,811, issued Jun. 4, 1991, the flash circuit board 43 can include means for visibly indicating the number of times the camera unit 3 has been recycled.

PARTS LIST FOR FIGS, 1–5

1. single-use camera
3. light-tight camera unit
5. taking lens
7. shutter blade
9. frame counter
11. flash unit
13. outer cover
15. front opening
17. top opening
19. shutter release button
21. front opening
23. front viewfinder window
25. see-through viewfinder
27. rear viewfinder window
29. top opening
31. front opening
33. flash emission window
35. top opening
37. flash-ready light emitting diode
39. front opening
41. push element
43. flash circuit board
45. flash tube
47. flash charger circuit
49. flash charger circuit switch
51. IC
53. flash-shutter synch switch
55. counter
57. code inputting device
59. pointer
61 & 63. pins
65 & 67. contacts
69. look-up table
71 & 73. pins
75 & 77. contacts
79. comparator
81. warning indicator
83 & 85. transistors -continued

PARTS LIST FOR FIGS, 1–5

87. lead-line
89. fuse-link portion
91. diode
93. capacitor
95. inverter

What is claimed is:

1. A method of preventing unauthorized recycling of a single-use camera but permitting authorized reuse of the camera, comprising first determining that a particular event in the camera has occurred, then disabling a function of the camera to prevent unauthorized reuse of the camera, and then inputting an electrical, optical, or magnetic reset code to the camera to re-enable the function that has been disabled to permit authorized reuse of the camera, is characterized further by:

determining whether a reset code that is inputted to the camera is valid or invalid; and preventing the function that has been disabled permanently from being re-enabled when the reset code is determined to be invalid; to then prevent the input Of a valid code from ever re-enabling the function.

2. A method as recited in claim 1, wherein the function that has been disabled is prevented from being re-enabled permanently by applying electrical energy to an electrical component in the camera which operates to destroy the electrical component.

3. A single use camera comprising means for determining that completed use of the camera has occurred, means for disabling a function of the camera to prevent unauthorized reuse of the camera when completed use of the camera has occurred, and means for receiving an electrical, optical, or magnetic reset code from a separate code inputting device to re-enable the function that has been disabled to permit authorized reuse of the camera, is characterized further by:

means for determining whether a reset code that is inputted to the camera is valid or invalid; and means for preventing the function that has been disabled permanently from being re-enabled when the reset code is determined to be invalid, to then prevent the input of a valid code from ever re-enabling the function.

4. A method of preventing unauthorized recycling of a single-use camera but permitting authorized reuse of the camera, comprising first determining that a particular event in the camera has occurred, then disabling a function of the camera to prevent unauthorized reuse of the camera, and then inputting an electrical, optical, or magnetic reset code to the camera to re-enable the function that has been disabled to permit authorized reuse of the camera, is characterized further by:

determining whether a reset code that is inputted to the camera is valid or invalid, and unconditionally preventing the function that has been disabled from being re-enabled for a predetermined fixed period of time when the reset code is determined to be invalid, to allow the input of a valid code to re-enable the function only after the elapse of the predetermined fixed period of time.

5. A method as recited in claim 4, wherein the function that has been disabled is unconditionally prevented from being re-enabled for the predetermined fixed period of time by charging a power capacitor to provide electrical energy for the predetermined fixed period of time to keep the function disabled.

6. A method of preventing unauthorized recycling of a single-use camera but permitting authorized reuse of the camera, comprising first determining that a particular event in the camera has occurred, then disabling a function of the camera to prevent unauthorized reuse of the camera, and then inputting a reset code to the camera to re-enable the function that has been disabled to permit authorized reuse of the camera, is characterized further by:

determining whether a reset code that is inputted to the camera is valid or invalid;

preventing the function that has been disabled from being re-enabled for at least a predetermined delay when the reset code is determined to be invalid; and discontinuing to prevent the function that has been disabled from being re-enabled only after the elapse of the predetermined delay, to then allow the input of a reset code that is determined to be valid to re-enable the function.

7. A single-use camera comprising means for determining that completed use of the camera has occurred, means for disabling a function of the camera to prevent unauthorized reuse of the camera when completed use of the camera has occurred, and means for receiving an electrical, optical or magnetic reset code from a separate code inputting device to re-enable the function that has been disabled to permit authorized reuse of the camera, is characterized further by:

means for determining whether a reset code that is inputted to the camera is valid or invalid; and means for preventing the function that has been disabled from being re-enabled at least for a period of time when the reset code is determined to be invalid, and for discontinuing to prevent the function from being re-enabled only after the elapse of the period of time to then allow the input of a valid code to re-enable the function.

8. A single-use camera as recited in claim 7, wherein said means for preventing the function that has been disabled from being re-enabled for the period of time includes a power capacitor which is charged to provide electrical energy for the period of time to keep the function disabled.

9. A single-use camera comprising means for determining that completed use of the camera has occurred, means for disabling a function of the camera to prevent unauthorized reuse of the camera when completed use of the camera has occurred, and means for receiving an electrical, optical or magnetic reset code from a separate code inputting device to re-enable the function that has been disabled to permit authorized reuse of the camera, is characterized further by:

means for determining whether a reset code that is inputted to the camera is valid or invalid; and means for unconditionally preventing the function that has been disabled from being re-enabled at least for a predetermined delay when the reset code is determined to be invalid, to prevent the input of a valid code from re-enabling the function during the predetermined delay.

* * * * *